US011059351B2

(12) United States Patent
Zenner et al.

(10) Patent No.: US 11,059,351 B2
(45) Date of Patent: Jul. 13, 2021

(54) SYSTEM AND METHOD FOR HEATING PASSENGER CABIN WITH COMBINATION OF POWER ELECTRONICS AND ELECTRIC MACHINE WASTE HEAT

(71) Applicant: Ford Global Technologies, LLC, Dearborn, MI (US)

(72) Inventors: Thomas Zenner, Dueren (DE); Daniel Benjamin Kok, Ann Arbor, MI (US); Serdar Hakki Yonak, Ann Arbor, MI (US); Kenneth J. Jackson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 542 days.

(21) Appl. No.: 15/962,789

(22) Filed: Apr. 25, 2018

(65) Prior Publication Data
US 2019/0329628 A1 Oct. 31, 2019

(51) Int. Cl.
*B60H 1/14* (2006.01)
*B60H 1/00* (2006.01)
*B60H 1/03* (2006.01)
*F01M 5/00* (2006.01)

(52) U.S. Cl.
CPC ......... *B60H 1/143* (2013.01); *B60H 1/00385* (2013.01); *B60H 1/034* (2013.01); *F01M 5/002* (2013.01)

(58) Field of Classification Search
CPC .... B60H 1/143; B60H 1/00385; B60H 1/034; F01M 5/002
See application file for complete search history.

(56) References Cited

U.S. PATENT DOCUMENTS

| 5,954,266 | A | 9/1999 | Hoshino et al. | |
| 6,427,640 | B1 | 8/2002 | Hickey et al. | |
| 6,454,180 | B2 * | 9/2002 | Matsunaga | B60H 1/00485 165/41 |
| 6,691,925 | B2 | 2/2004 | Roberts et al. | |
| 8,042,609 | B2 * | 10/2011 | Sarnie | F16H 57/0413 165/202 |
| 8,336,319 | B2 * | 12/2012 | Johnston | B60L 1/003 62/79 |

(Continued)

FOREIGN PATENT DOCUMENTS

JP 2001263061 A * 9/2001 ............. B60K 6/543

OTHER PUBLICATIONS

Meyer, J.J., Lustbader, J., Agathocleous, N., Vespa, A. et al., "Range Extension Opportunities While Heating a Battery Electric Vehicle," SAE Technical Paper 2018-01-0066, 2018, doi: 10.4271/2018-01-0066, Apr. 3, 2018 (Year: 2018).*

*Primary Examiner* — Kenneth J Hansen
*Assistant Examiner* — Phillip Decker
(74) *Attorney, Agent, or Firm* — David B Kelley; Brooks Kushman P.C.

(57) ABSTRACT

A vehicle includes an oil-cooling system arranged to circulate oil through an electric machine and an oil-to-coolant heat exchanger. A coolant system has conduit arranged to circulate coolant through an inverter, a heater core, and the heat exchanger. A climate control system is arranged to circulate an airstream through the heater core to heat a passenger cabin with waste heat from the electric machine and the inverter.

13 Claims, 3 Drawing Sheets

(56) References Cited

U.S. PATENT DOCUMENTS

| | | | |
|---|---|---|---|
| 8,534,571 B2* | 9/2013 | Schwartz | F01P 7/167 237/12.3 B |
| 8,689,741 B2 | 4/2014 | Park et al. | |
| 8,753,762 B2* | 6/2014 | Major | H01M 10/625 429/120 |
| 8,812,183 B2* | 8/2014 | Tanaka | B60W 30/194 701/22 |
| 8,851,153 B2* | 10/2014 | Park | B60L 58/26 165/41 |
| 9,309,982 B2* | 4/2016 | Akiyama | B60L 3/0069 |
| 9,321,479 B2 | 4/2016 | Wankhede et al. | |
| 9,533,544 B2* | 1/2017 | Johnston | B60H 1/00278 |
| 9,561,704 B2* | 2/2017 | Enomoto | B60H 1/32284 |
| 9,631,547 B2* | 4/2017 | Porras | F01P 7/165 |
| 9,758,008 B2* | 9/2017 | Hashigaya | B60H 1/00785 |
| 9,758,011 B2* | 9/2017 | Johnston | B60H 1/00278 |
| 9,796,244 B2* | 10/2017 | Cook | F16H 57/0417 |
| 9,827,824 B2* | 11/2017 | Enomoto | B60H 1/22 |
| 9,849,753 B2* | 12/2017 | Martinchick | B60H 1/00392 |
| 10,065,478 B2* | 9/2018 | Makihara | B60H 1/00899 |
| 10,160,288 B2* | 12/2018 | Park | F01P 7/162 |
| 10,183,548 B2* | 1/2019 | Enomoto | B60L 58/26 |
| 10,308,096 B2* | 6/2019 | Oh | B60L 58/26 |
| 10,369,866 B2* | 8/2019 | Yamanaka | B60H 1/143 |
| 10,427,491 B2* | 10/2019 | Johnston | B60H 1/00385 |
| 10,450,938 B2* | 10/2019 | Nagai | F02B 29/0412 |
| 10,493,819 B2* | 12/2019 | Zenner | B60H 1/143 |
| 10,619,530 B2* | 4/2020 | Dries | F01P 7/16 |
| 2005/0274814 A1* | 12/2005 | Schwartz | B60H 1/00392 237/28 |
| 2014/0041826 A1* | 2/2014 | Takeuchi | B60H 1/00899 165/10 |
| 2014/0070013 A1* | 3/2014 | Stanek | B60H 1/04 237/28 |
| 2014/0103128 A1* | 4/2014 | Patel | F01P 3/20 237/5 |
| 2014/0144160 A1* | 5/2014 | Jackson | H01M 10/625 62/62 |
| 2014/0216709 A1* | 8/2014 | Smith | B60H 1/00278 165/287 |
| 2016/0159204 A1* | 6/2016 | Katoh | B60H 1/32284 62/185 |
| 2017/0021698 A1* | 1/2017 | Hatakeyama | B60H 1/143 |
| 2017/0088006 A1* | 3/2017 | Blatchley | B60H 1/00278 |
| 2017/0175612 A1* | 6/2017 | Tokozakura | F01P 7/14 |
| 2017/0349030 A1* | 12/2017 | Miura | B60K 11/04 |
| 2018/0264913 A1* | 9/2018 | Enomoto | B60L 58/27 |
| 2019/0118610 A1* | 4/2019 | Johnston | B60H 1/00899 |
| 2019/0225052 A1* | 7/2019 | Zenner | B60H 1/00271 |
| 2019/0308491 A1* | 10/2019 | Lee | B60H 1/00278 |
| 2019/0344635 A1* | 11/2019 | Stacey | B60H 1/06 |
| 2020/0031193 A1* | 1/2020 | Lee | H01M 10/637 |
| 2020/0079179 A1* | 3/2020 | Zenner | B60H 1/143 |
| 2020/0207182 A1* | 7/2020 | Ishizeki | B60H 1/00921 |

* cited by examiner

SYSTEM AND METHOD FOR HEATING PASSENGER CABIN WITH COMBINATION OF POWER ELECTRONICS AND ELECTRIC MACHINE WASTE HEAT

TECHNICAL FIELD

The present disclosure relates to hybrid-electric and fully electric vehicles that have a climate control system arranged to heat a passenger cabin using heat generated by at least an inverter and an electric machine.

BACKGROUND

Traditional vehicles powered by an internal-combustion engine typically heat a passenger cabin of the vehicle using waste heat generated by the engine. Coolant heated by the engine is circulated to a heater core disposed within a heating ventilation and air conditioning (HVAC) unit. The HVAC unit includes a blower that circulates an airstream through the heater core and into the passenger cabin to provide heat.

To improve fuel economy and diminish environmental impact, electric and hybrid electric vehicles have been developed to improve fuel economy and reduce pollution. These vehicles may generate no or insufficient engine waste heat to meet cabin-heating requirements. Consequently, other sources of heat are needed to sufficiently heat the cabin.

SUMMARY

According to one embodiment, a vehicle includes an oil-cooling system arranged to circulate oil through an electric machine and an oil-to-coolant heat exchanger. A coolant system has conduit arranged to circulate coolant through an inverter, a heater core, and the heat exchanger. A climate control system is arranged to circulate an airstream through the heater core to heat a passenger cabin with waste heat from the electric machine and the inverter.

According to another embodiment, a method of heating a passenger cabin with waste heat includes operating an inverter and an electric machine to generate heat, and circulating coolant through the inverter to transfer heat from the inverter to the coolant. The method further includes boosting a temperature of the coolant with heat generated by the electric machine, circulating the coolant to the heater core, and heating an airstream bound for a passenger cabin by circulating the airstream through the heater core.

According to yet another embodiment, a vehicle includes an oil-cooling system arranged to circulate oil through a transmission and an oil-to-coolant heat exchanger. A coolant system is arranged to circulate coolant through an inverter, a heater core, and the heat exchanger. A climate control system is arranged to circulate an airstream through the heater core to heat a passenger cabin with waste heat from the transmission and the inverter.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
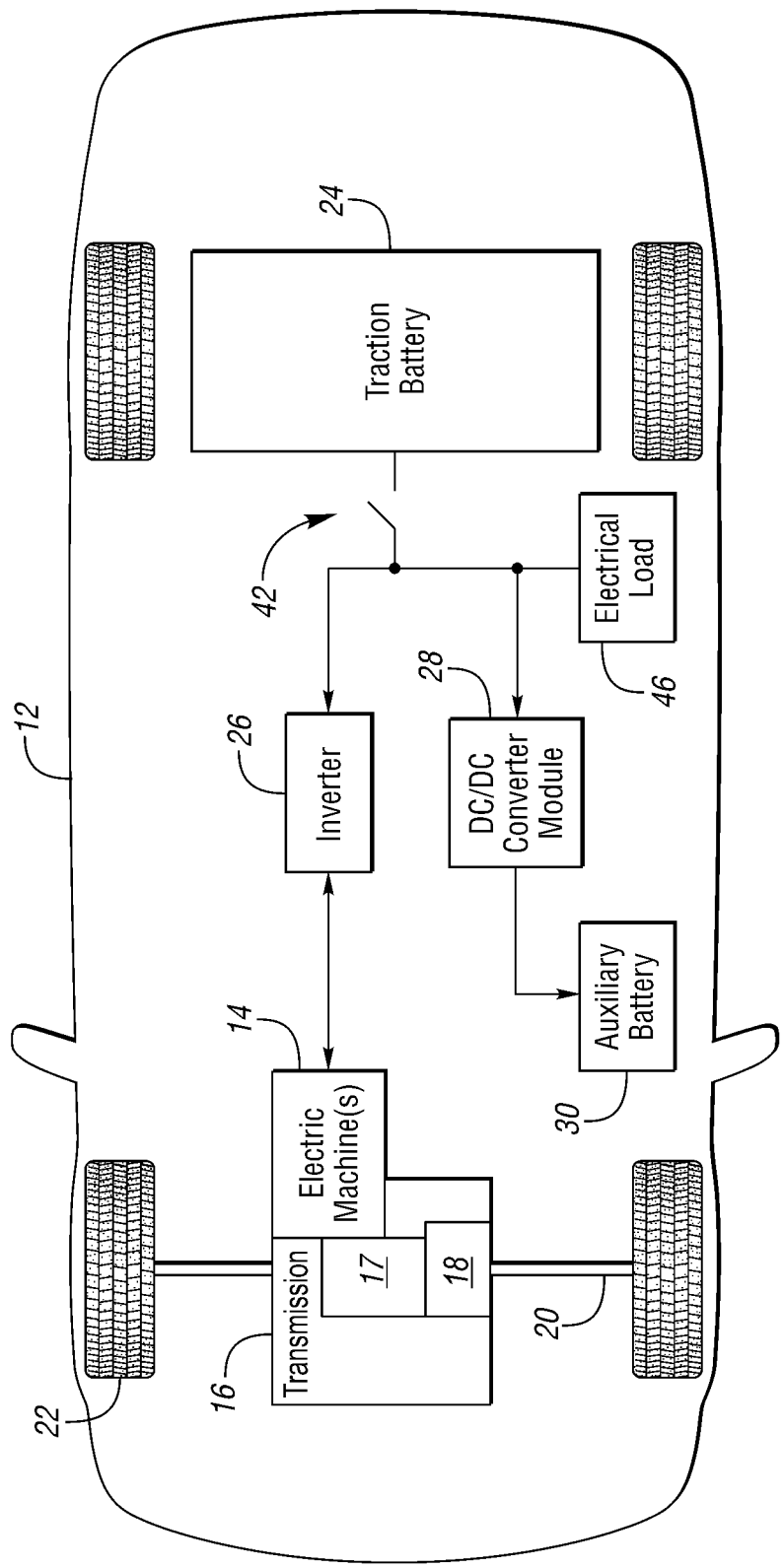
FIG. 1 is a schematic diagram of an electric vehicle.

FIG. 1 depicts a battery-electric vehicle (BEV) 12, but this disclosure is not limited to a BEV, and the vehicle 12 may be a hybrid in other embodiments. The vehicle 12 may include one or more electric machines 14 mechanically coupled to a transmission 16. In some embodiments, the electric machine 14 may be housed within the transmission 16. The transmission 16 includes a gearbox 17 such as a one-speed gearbox or a multi-speed gearbox. The electric machine 14 may be capable of operating as a motor or a generator. The transmission 16 may include a differential 18 that delivers power between the driven wheels 22 via axle shafts 20. In one or more embodiments, the transmission 16 and the electric machine 14 are packaged as an electronic axle.

A traction battery or battery pack 24 stores energy that can be used by the electric machine 14. The traction battery 24 typically provides a high-voltage direct current (DC) output. The traction battery 24 is electrically coupled to power electronics such as an inverter 26. One or more contactors 42 may isolate the traction battery 24 from other components when opened and connect the traction battery 24 to other components when closed. An inverter 26 is electrically coupled to the electric machine 14 and provides the ability to bi-directionally transfer energy between the traction battery 24 and the electric machine 14. For example, a traction battery 24 may provide a DC voltage while the electric machine 14 may operate with three-phase alternating current (AC). The inverter 26 may convert the DC to three-phase AC to operate the electric machine 14. In a regenerative mode, the inverter 26 acts as a rectifier to convert the three-phase AC from the electric machine 14 acting as generators to the DC compatible with the traction battery 24.

In addition to providing energy for propulsion, the traction battery 24 may provide energy for other vehicle electrical systems. The vehicle 12 may include a DC/DC converter 28 that converts the high-voltage DC output of the traction battery 24 to a low-voltage DC supply that is compatible with low-voltage vehicle loads. An output of the DC/DC converter module 28 may be electrically coupled to an auxiliary battery 30 (e.g., 12-volt battery). The low-voltage systems may be electrically coupled to the auxiliary battery. Other high-voltage loads 46, such as a compressor, may be coupled to the high-voltage output of the traction battery 24.

One or more electrical loads 46 may be coupled to the high-voltage bus. The electrical loads 46 may have an associated controller that operates and controls the electrical loads 46 when appropriate. Examples of electrical loads 46 may be a heating system or an air-conditioning system.

Electronic systems in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete wires. The vehicle network may include any hardware and software components that aid in transferring signals and data between modules. The vehicle network is not shown in FIG. 1 but the vehicle network may connect to any electronic module that is present in the vehicle 12. A vehicle system controller (VSC) may be present to coordinate the operation of the various components.

The inverter 26, the DC/DC converter 28, the transmission 16, the electric machine 14, and other components generate heat during operation of the electric powertrain. This heat generation may occur when the vehicle is utilizing the electric machine 14 to propel the vehicle and when the battery is being charged either through regenerative braking or by a charge port if equipped. The heat generating components of the electric powertrain, such as the inverter 26, the DC/DC converter 28, and the electric machine 14 may require one or more thermal management systems to maintain the components within a desired temperature window. Typically, the waste heat generated by the components is dissipated to the outside air and is not utilized for heating the passenger cabin. This disclosure presents climate control systems arranged to utilize waste heat from one or more of the inverter 26, the DC/DC converter 28, the transmission 16, and the electric machine 14, to heat a passenger cabin of the vehicle 12.

The transmission 16 and the electric machine 14 may be coupled by an oil-cooling system that circulates oil, e.g., transmission fluid, through the transmission 16, the differential 18, and the electric machine 14. The oil-cooling system may be in thermal communication with the power electronics, e.g., inverter 26 and DC/DC converter 28, so that waste heat of the at least transmission 16, the differential 18, and the electric machine 14 can be used to heat the passenger cabin.

Unlike an internal-combustion engine, which generates sufficient waste heat to warm the cabin, the power electronics, the transmission, and the electric machine may not produce enough waste heat to warm the cabin without the aid of a heat booster. The heat booster may increase the temperature of the working fluid, e.g., liquid coolant, circulating through the heater core so that the cabin can be fully heated, or may increase the temperature of an airstream within the HVAC unit.

Figure 2:
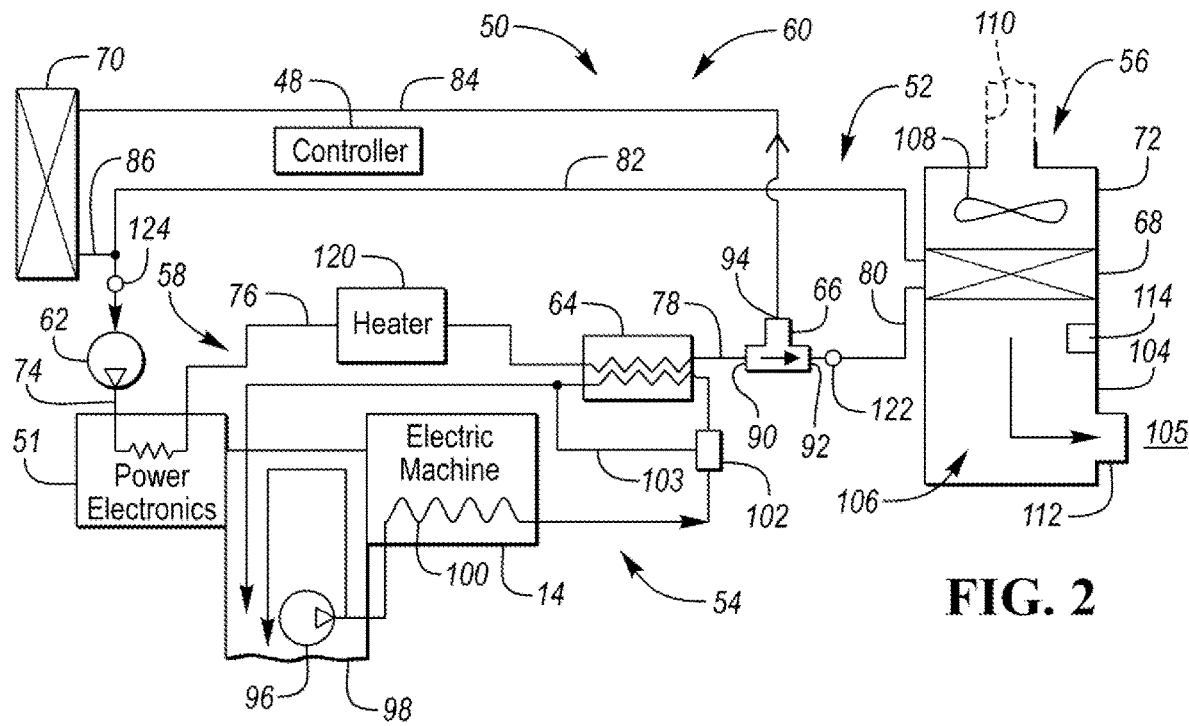
FIG. 2 is a schematic diagram of a thermal management system having a coolant system and an oil-cooling system that cooperate to heat a passenger cabin of the vehicle.
Figure 3:
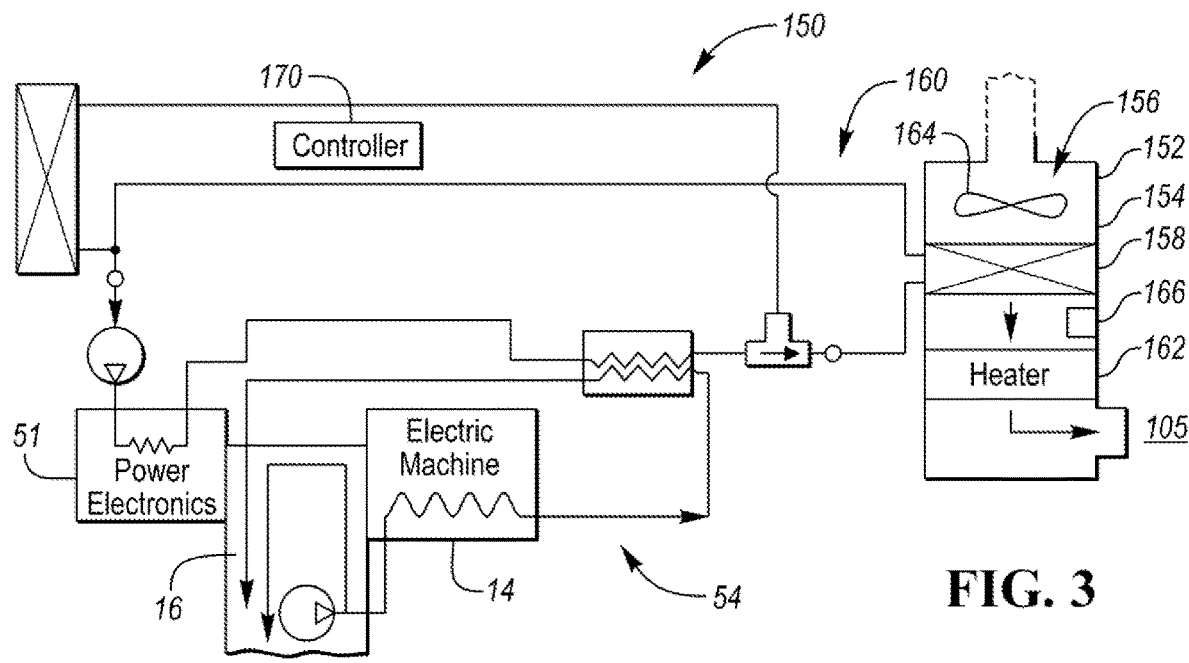
FIG. 3 is a schematic diagram of another thermal management system having a coolant system and an oil-cooling system that cooperate to heat a passenger cabin of the vehicle.

FIGS. 2 and 3 disclose example embodiments of thermal management systems that heat the passenger cabin using waste heat of at least the power electronics and the powertrain.

Referring to FIG. 2, a thermal management system 50 includes a coolant system 52, an oil-cooling system 54, and a climate control system 56. The coolant system 52 and the oil-cooling system 54 are in thermal communication via an oil-to-coolant heat exchanger 64. The coolant system 52 is configured to thermally regulate the power electronics 51 including the inverter 26 and/or the DC/DC converter 28 and to provide waste heat to the climate control system 56 by circulating coolant to an HVAC unit 72. Used herein, "coolant" refers to a liquid coolant such as ethylene glycol, other type of anti-freeze, or other suitable liquid. The coolant system 52 includes a main loop 58, a radiator loop 60, and a valve 66 for controlling fluid flow between the loops 58, 60. The coolant system 52 is powered by a pump 62 that circulates coolant through conduit and the components of the system. In the illustrated embodiment, coolant flows from the pump 62 to the power electronics 51 via conduit 74. The coolant absorbs waste heat from the power electronics 51 as it circulates therethrough. The power electronics 51 are connected to the oil-to-coolant heat exchanger 64 by conduit 76. The heat exchanger 64 is connected to an inlet 90 of valve 66 by conduit 78, and an outlet 92 of valve 66 is connected to the heater core 68 by conduit 80. The heater core 68 is connected back to the pump 62 by conduit 82. The radiator loop 60 circulates coolant from a second outlet 94 of the valve to a radiator 70 via conduit 84 and bypasses the HVAC unit 72. The radiator 70 is connected to conduit 82 by conduit 86.

The valve 66 is actuatable between a plurality of positions to proportion coolant between the outlet 92 and the outlet 94. The valve 66 includes at least a first position in which 100% of the coolant is circulated to the outlet 92, a second position in which 100% of the coolant circulated to the outlet 94, and one or more intermediate positions in which a proportion of coolant is routed to both outlet 92 and outlet 94. The valve 66 may be an electronically controlled valve that is in electronic communication with a controller 48. The controller 48 may include programming for actuating the valve 66 based on operating conditions of the thermal management system 50. In an alternative embodiment, the three-way valve 66 may be replaced with a pair of valves, which may be on-off valves as opposed to the above-described proportioning valve.

The controller 48 may be a vehicle-based computing system that includes one or more controllers that communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers.

The oil-cooling system 54 is configured to thermally manage the electric machine 14 and the transmission 16 and to circulate waste heat to the coolant system 52 so that the passenger cabin 105 can be heated with waste heat generated by the transmission 16 and the electric machine 14 and so that the transmission 16 and the electric machine 14 can be heated by the coolant system 52. The transmission 16 includes conduit and/or passageways 100 configured to circulate oil through the electric machine 14, the gearbox 17, and/or the differential 18. The conduit and/or passageways 100 are also configured to circulate oil through the oil-to-coolant heat exchanger 64. The heat exchanger 64 is designed to transfer heat between the oil and the coolant without mixing the fluids. The oil is circulated by a pump 96 located within the transmission and arranged to draw oil from a transmission sump 98. The oil-cooling system 54 may include a valve 102 upstream of the heat exchanger 64 and a bypass loop 103. The valve 102 may be electronically controlled by the controller 48. The valve 102 may be actuated to circulate oil to the bypass loop 103 at least when the oil is colder than the coolant so that oil-cooling system 54 does not absorb heat from the coolant system 54 when cabin heating is being requested.

The climate control system 56 is responsible for heating and/or cooling the passenger cabin 105 of the vehicle. The HVAC unit 72 is typically located under a dash of the vehicle. The HVAC unit 72 includes a housing 104 defining an interior 106. The heater core 68 is disposed within the interior 106 and is configured to receive a fresh airstream from a fresh air inlet 110. A blower 108 is disposed upstream of the heater core 68 and circulates air through the HVAC unit 72. The HVAC unit 72 includes at least one cabin vent 112 that provides air into the passenger cabin 105. The HVAC unit 72 may also include air-conditioning components such as an evaporator (not shown), and a blend door (not shown) for controlling the temperature of the airstream. The HVAC unit 72 may include a temperature sensor 114 located within the interior 106 for sensing temperature of the airstream exiting the heater core 68. The sensor 114 may be in electronic communication with the controller 48 and configured to output a signal to the controller 48 indicative of the airstream temperature.

In some embodiments, the waste heat generated by the power electronics 51, the transmission 16, and the electric machine 14 may be insufficient to fully heat the cabin under all operating conditions. The thermal management system 50 may include an optional heater 120 for boosting a temperature of the coolant. The heater 120 may be disposed on conduit 76 upstream of the heat exchanger 64 or may be located between the heater core 68 and the heat exchanger 64. If the heater 120 is located upstream of the heat exchanger 64, then the heater 120 can be used to heat the oil to reduce friction losses in the transmission 16.

The heater 120 may be an electric-resistance heater such as a positive temperature coefficient (PTC) heater. The heater 120 may be powered by the traction battery 24 or by a low-voltage auxiliary battery such as a 12 or 24 V battery. Many electric vehicles utilize a PTC heater as the sole heat source for the passenger cabin. These PTC heaters typically require high voltages and are powered by the high-voltage bus as opposed to a low-voltage source, e.g., the 12 V auxiliary battery. The high-voltage PTC heaters typically require a large amount of electrical power, which reduces vehicle range. In this disclosure, however, the heater 120 is merely a booster. As such, a lower voltage heater may be utilized in some applications to extend the electric range. In others, the heater 120 may be powered by the high-voltage bus. Other types of heaters may also be used.

The amount of heat boosting is dependent upon cabin-heating requirements and the design of the heater core 68. In one embodiment, the heater core 68 is designed to receive a 90 degrees Celsius coolant in order to provide high heat. Depending on operating conditions, the power electronics 51, the transmission 16, and the electric machine 14 may only heat the coolant to 70 degrees Celsius, in which case, the heater 120 is operated to boost the coolant temperate by 20 degrees Celsius. These temperatures are merely illustrative and are not limiting. The coolant system 52 may include a temperature sensor 122 configured to sense a temperature of the coolant circulating therethrough, and output a signal indicative of the coolant temperature to the controller 48. The controller 48 may operate the heater 120 based on signals from the temperature sensor 122.

The thermal management system 50 may be operated in a plurality of modes such as a cabin-heating mode and a cabin-off mode. During these modes, the power electronics 51, the transmission 16, and the electric machine 14 may be cooled by the radiator 70 (cabin-off mode), the heater core 68 (cabin-heating mode), or a combination of both.

According to one embodiment, the valve 66 is actuated to the first position when in the cabin-heating mode so that the coolant is circulated to the heater core 68. The pumps 62 and 96 are energized so that heat is transferred from the heat-generating components to the working fluids to simultaneously cool the components while heating the working fluids. The valve 102 is actuated to circulate oil to the heat exchanger 64 if the oil temperature exceeds the coolant temperature. Otherwise, oil is circulated to the bypass loop 103. The blower 108 is energized to draw an airstream through the heater core 68 to heat the airstream delivered to the cabin 105. The heater 120 may be energized if needed based on signals from the temperature sensors 114, 122. The coolant system 52 may include a temperature sensor 124 that senses temperature of the coolant entering the power electronics 51. The controller 48 is in electronic communication with the temperature sensor 124 and monitors the temperature sensor 124 to ensure that the coolant is below a threshold temperature. If the coolant exceeds the threshold temperature, the valve 66 may be actuated to route a proportion of coolant to the radiator 70. This may occur when the HVAC unit 72 is operating on low When in cabin-off mode, the valve 66 is actuated to the second position to cool the power electronics 51, the electric machine 14, and the transmission 16 with the radiator 70. When the valve 66 is in the second position, coolant is circulated to the radiator loop 60 to bypass the heater core 68. The valve 102 is actuated to circulate oil to the heat exchanger 64 if the oil temperature exceeds a threshold temperature or if the coolant is warmer than the oil. Oil may be circulated to the bypass loop 103 if the coolant is colder than the oil.

Referring to FIG. 3, a thermal management system 150 according to an alternative embodiment is illustrated. The thermal management system 150 is similar to the above-described thermal management system 50 except that the heater has been moved from the coolant loop to the HVAC unit 152. The HVAC unit 152 includes a housing 154 that defines an interior 156. A heater core 158 is disposed within the interior 156 and is in fluid communication with the coolant system 160. The heater 162 is disposed in the interior 156 downstream of the heater core 158 and is configured to heat an airstream circulating therethrough. A blower 164 circulates an airstream across the heater core 158 and the heater 162 to heat the airstream prior to being delivered within the passenger cabin. The heater 162 boosts a temperature of this airstream after passing through the heater core 158 if needed. The heater 162 may be electronically controlled by a controller 170 and is energized by the controller 170 when the heater core 158 is incapable of heating the airstream to a desired temperature. A temperature sensor 166 may be disposed within the HVAC unit 152 downstream of the heater core 158 and upstream of the heater 162. The temperature sensor 166 is in electronic communication with the controller 170 and is configured to output a signal indicative of the airstream temperature exiting the heater core 158. The controller 170 may operate the heater 162 based on signals from the sensor 166. For example, if the airstream temperature is less than the desired airstream temperature as sensed by the sensor 166, the controller 170 may energize the heater 162 to boost the temperature of the airstream to the desired temperature.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle controller, such as controller 48. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Any reference to "a controller" refers to one or more controllers.

Figure 4:
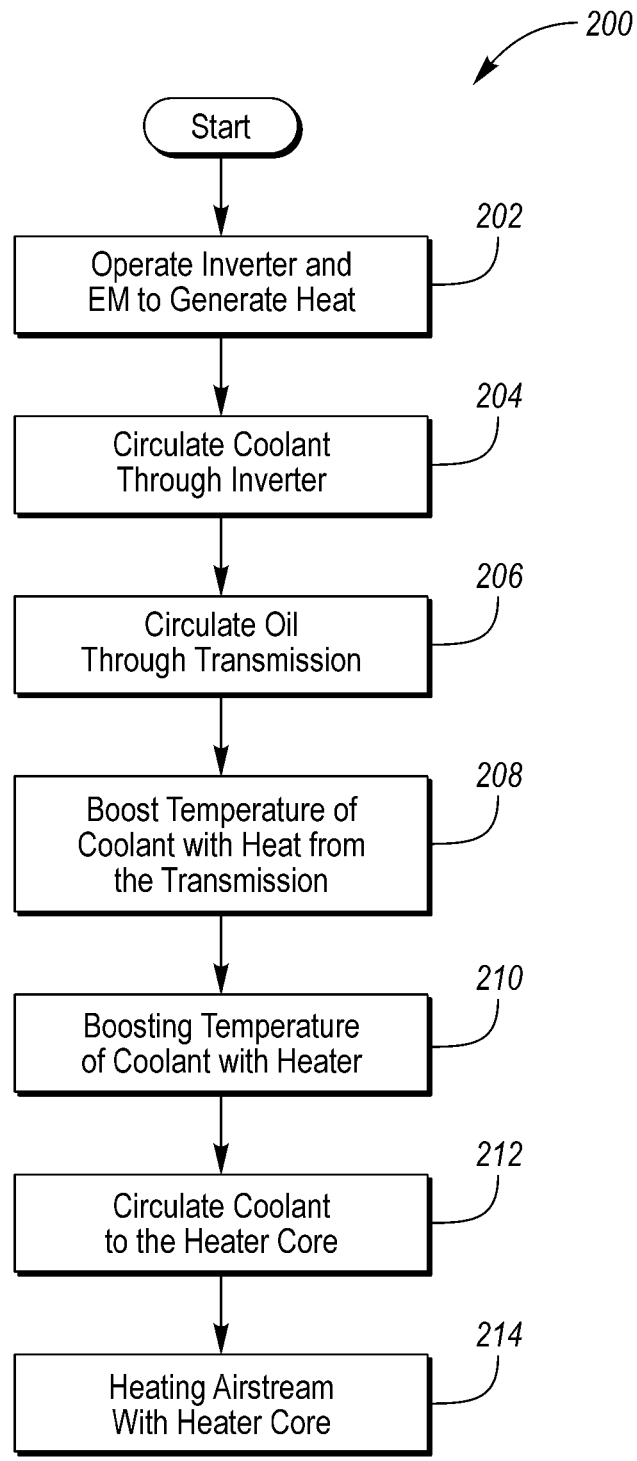
FIG. 4 is a flow chart showing a method for heating a passenger cabin with waste heat.

FIG. 4 is a flowchart 200 of a method for controlling a thermal management system to heat a passenger cabin with waste heat. The method includes operating an inverter and an electric machine to generate heat at step 202. At step 204, coolant is circulated through the inverter to transfer heat from the inverter to the coolant. Coolant may also be circulated through other power electronics such as the DC/DC converter to transfer additional waste heat to the coolant. At step 206, oil is circulated through the transmission so that waste heat from the transmission components, such as the electric machine(s), the gearbox, and the differential, are transferred into the oil. Heat is exchanged between the oil and the coolant to boost a temperature of the coolant with the waste heat from the transmission at step 208. If necessary, the temperature of the coolant is further boosted with a heater at step 210. The coolant is circulated through the heater core at step 212, and an airstream is circulated through the heater core to heat the airstream prior to being circulated to the passenger cabin at step 214.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an oil-cooling system arranged to circulate oil through an electric machine, an oil-to-coolant heat exchanger, a first electronically controlled valve, a main conduit, and a bypass conduit that bypasses the heat exchanger, wherein the first valve is located upstream of the heat exchanger and is configured to selectively route oil to the bypass conduit and to the heat exchanger depending upon a position of the first valve;
   a coolant system including conduit arranged to circulate coolant through an inverter, a heater, a heater core, the heat exchanger, a radiator, and a second electronically controlled valve, the second valve having at least a first position in which the coolant is circulated to the radiator and a second position in which the coolant is circulated to the heater core, wherein the heater is upstream of the heat exchanger;
   a climate control system arranged to circulate an airstream through the heater core to heat a passenger cabin with waste heat from the electric machine and the inverter; and
   a controller programmed to:
      actuate the second valve to the second position responsive to cabin heating being requested, and
      actuate the first valve to route the oil to the bypass conduit when the oil is colder than the coolant so that the oil-cooling system does not absorb heat from the coolant system when the cabin heating is being requested.

2. The vehicle of claim 1, wherein the heater is electric.

3. The vehicle of claim 1 further comprising a gearbox, wherein the oil-cooling system is further arranged to circulate the oil through the gearbox.

4. The vehicle of claim 1, wherein the second valve has a third position in which the coolant is circulated to both the radiator and the heater core.

5. The vehicle of claim 1, wherein the controller is further programmed to energize the electric heater responsive to a temperature of the airstream exiting the heater core being less than a requested temperature.

6. The vehicle of claim 1, wherein the controller is further programmed to energize the electric heater responsive to a temperature of the coolant being less than a set temperature.

7. The vehicle of claim 1, wherein the electric machine is upstream of the oil-to-coolant heat exchanger.

8. The vehicle of claim 1, wherein the first valve includes a first outlet connected to the heat exchanger and a second outlet connected to the bypass conduit.

9. A vehicle comprising:
- an oil-cooling system arranged to circulate oil through a transmission, an oil-to-coolant heat exchanger, a first electronically controlled valve, a main conduit, and a bypass conduit that bypasses the heat exchanger, wherein the first valve is located upstream of the heat exchanger and is configured to selectively route oil to the bypass conduit and to the heat exchanger depending upon a position of the first valve;
- a coolant system arranged to circulate coolant through an inverter, a heater, a heater core, the heat exchanger, a radiator, and a second electronically controlled valve, the second valve having at least a first position in which the coolant is circulated to the radiator and a second position in which the coolant is circulated to the heater core;
- a climate control system arranged to circulate an airstream through the heater core to heat a passenger cabin with waste heat from the transmission and the inverter; and
- a controller programmed to actuate the first valve to route the oil to the bypass conduit when the oil is colder than the coolant.

10. The vehicle of claim 9, wherein the transmission includes an electric machine and wherein the oil-cooling system is arranged to circulate oil through the electric machine.

11. The vehicle of claim 9, wherein the controller is further programmed to actuate the second valve to the second position responsive to cabin heating being requested.

12. The vehicle of claim 9 further comprising a controller programmed to actuate the second valve to the second position responsive to cabin heating being requested.

13. The vehicle of claim 9, wherein the heater is upstream of the heat exchanger.

\* \* \* \* \*